(12) United States Patent
Kim

(10) Patent No.: US 12,399,570 B2
(45) Date of Patent: Aug. 26, 2025

(54) REMOTE CONTROL SYSTEM

(71) Applicant: Byung Soo Kim, Incheon (KR)

(72) Inventor: Byung Soo Kim, Incheon (KR)

( * ) Notice: Subject to any disclaimer, the term of this patent is extended or adjusted under 35 U.S.C. 154(b) by 0 days.

(21) Appl. No.: 17/918,276

(22) PCT Filed: Sep. 27, 2021

(86) PCT No.: PCT/KR2021/013106
§ 371 (c)(1),
(2) Date: Oct. 11, 2022

(87) PCT Pub. No.: WO2022/075644
PCT Pub. Date: Apr. 14, 2022

(65) Prior Publication Data
US 2024/0211049 A1 Jun. 27, 2024

(30) Foreign Application Priority Data
Oct. 7, 2020 (KR) .................. 10-2020-0129696

(51) Int. Cl.
*G06F 3/01* (2006.01)
(52) U.S. Cl.
CPC .................... *G06F 3/017* (2013.01)
(58) Field of Classification Search
CPC ...... G06F 3/017; G06F 3/0304; G06F 3/0482; G06F 3/04842; G06F 3/04847; G06F 3/04855; G06F 3/04883; G06F 3/04817; G06F 3/0488; G08C 2201/30; G08C 2201/32; G08C 17/00; G08C 17/02; H04Q 9/00
See application file for complete search history.

(56) References Cited

U.S. PATENT DOCUMENTS

2011/0154268 A1* 6/2011 Trent, Jr. ................ G06F 3/017
  715/863
2015/0150066 A1* 5/2015 Park ..................... H04N 21/435
  725/110

FOREIGN PATENT DOCUMENTS

| JP | 2011-253493 A | 12/2011 |
| KR | 10-2010-0131213 A | 12/2010 |
| KR | 10-2012-0045528 A | 5/2012 |
| KR | 10-2015-0032101 A | 3/2015 |
| KR | 10-2015-0061328 A | 6/2015 |
| KR | 10-1718070 B1 | 3/2017 |
| KR | 10-2203951 B1 | 1/2021 |

* cited by examiner

*Primary Examiner* — Matthew A Eason
*Assistant Examiner* — Chayce R Bibbee
(74) *Attorney, Agent, or Firm* — LRK PATENT LAW FIRM

(57) ABSTRACT

The present invention relates to a remote control system capable of executing or controlling operations or functions by using gestures. The remote control system operated by gestures includes: an input unit and an output unit; a storage unit for storing gesture information to be matched with an input gesture; and a control unit electrically connected to at least one of the input unit, the output unit, and the storage unit to recognize the gesture and control the system, wherein the control unit recognizes a gesture input by the input unit, matches the recognized gesture with the gesture information stored in the storage unit, executes an operation corresponding to the matched gesture information, and outputs to the output unit.

17 Claims, 5 Drawing Sheets

REMOTE CONTROL SYSTEM

CROSS-REFERENCE TO RELATED APPLICATIONS

The present application is a U.S. National Phase entry from International Application No. PCT/KR2021/013106, filed on Sep. 27, 2021, which claims priority to Korean Patent Application No. 10-2020-0129696, filed on Oct. 7, 2020, the disclosure of which is incorporated by reference herein in their entirety.

FIELD OF THE INVENTION

The present invention relates to a remote control system, and more particularly, to a remote control system capable of executing or controlling an operation or function through a gesture.

DESCRIPTION OF RELATED ART

Unless otherwise indicated herein, the material described in this section is not prior art to the claims of this application, and inclusion in this section is not an admission that it is prior art.

With the recent development of technology, a great number of electronic devices with various functions are emerging in various fields that are difficult to enumerate such as smart TVs, smartphones, AR and VR devices, interactive game consoles, smart home appliances, smart home automation, and smartization and electrification of automobiles. In addition, it provides a very diverse and numerous functions.

However, the remote control method to conveniently operate these functions from a distance has not developed significantly compared to the number of various electronic device and their functions are greatly increased.

The remote control method that is still most used is a method in which the remote controller has a button corresponding to each function, and when the button of the desired function is pressed, the electronic device receives the corresponding signal and the control unit recognizes it and executes the corresponding function.

The method of using this button-type remote controller provides the best convenience when the remote controller has as many buttons as the number of functions provided and the user easily selects and presses the button of the corresponding function.

However, it was possible a long time ago when it had only a small number of functions, but in the time of technological development at the same speed as now, the method of using a button-type remote controller has to be equipped with many buttons, so it becomes difficult to carry as it becomes large and heavy, in addition, it becomes difficult for the user to find and execute a desired function from among the numerous buttons, and convenience is lost.

Judging from the current situation, the remote controller of the karaoke machine seems to be the remote controller with the largest number of buttons that the user understands and can use commercially.

So, in order to overcome this, what was introduced from the method of using a button-type remote controller is to introduce four-way buttons and an OK button, and to show the functions to be executed on the screen, and to select and execute them.

For example, in the case of a current smart TV, there is no button that directly corresponds to selecting and running a specific app from among multiple apps on the screen, playing or stopping a specific video, or making a purchase on TV home shopping, Use the button of to find the function displayed on the screen, select it, and press the confirmation button to execute it.

For example, in the case of a current smart TV, when a user selects and executes a specific app from among multiple apps on the screen, plays or stops a specific video, or makes a purchase in TV home shopping, there is no button directly corresponding thereto. Therefore, it is to find and select the function displayed on the screen with the buttons of the four directions, and press the confirmation button to execute it.

However, the user's convenience is already lowered by continuously pressing the four-way button a lot and finally selecting the confirmation button. In addition, as more functions are added in the future, the user will press the four-way button and the confirmation button more and more to find the function on the screen, and thus the user convenience will be further lowered.

Also, recently, instead of the button-type remote controller, a method such as voice recognition or a 3D space mouse has been tried. However, in the case of voice recognition, the recognition rate and quick responsiveness are not yet as desired, and furthermore, it is annoying to the user to command and execute it by voice. And, in the case of the 3D space mouse, it has not been widely commercialized because it does not exhibit the responsiveness of selecting and executing quickly and accurately like a PC mouse.

Therefore, there is a need for a new remote control system with increased user convenience with quick responsiveness as well as convenient and easy remote control of many functions that can be made through technological development in the future as well as the present.

In this regard, Korean Patent Publication No. 10-2010-0131213 discloses a gesture-based remote control system. The gesture-based remote control system includes a camera module 300, an image recognition module 100, a wireless transmitter 400, and a main control electronic device 200. The image recognition module 100 is electrically connected to the camera module 300. The wireless transmitter 400 is electrically connected to the image recognition module 100. The main control electronic device 200 is detachably connected to the image recognition module 100. The main control electronic device 200 includes a monitor 202. The motion control command is obtained by recognizing the user's image in the camera module 300 having the image recognition module 100. The key control command is obtained from the motion control command and key code information by the image recognition module 100. The key control command is transmitted to the wireless transmitter 400 by the image recognition module 100. The key control command is transmitted to a control target electronic device by the wireless transmitter to control the control target electronic device.

PRIOR ART

Patent Document

Korean Patent Publication No. 10-2010-0131213 (2010 Dec. 15)

SUMMARY OF THE INVENTION

Technical Problem

An object of the present invention is to provide a new remote control system with increased user convenience with quick responsiveness while conveniently and easily executing numerous functions of electronic devices from a distance using gestures. In addition, the present invention is not limited to the technical problems as described above, and it is obvious that another technical problem may be derived from the following description.

Technical Solution

A remote control system operated by a gesture according to an embodiment of the present invention, comprising: an input unit and an output unit; a storage unit for storing gesture information to be matched with an input gesture; and a control unit electrically connected to at least one of the input unit, the output unit, and the storage unit to recognize the gesture and control the system, wherein the control unit recognizes a gesture input by the input unit, matches the recognized gesture with the gesture information stored in the storage unit, executes an operation corresponding to the matched gesture information, and outputs to the output unit.

According to a preferred feature of the present invention, the control unit outputs information about gestures to be input by the user to the output unit.

According to a preferred feature of the present invention, the control unit designates each gesture graphic for execution-purpose-graphic objects output through the output unit, and stores the information on the designated graphic objects and gesture graphics as gesture information to be matched with the gesture input by the input unit to the storage unit; wherein the graphic objects includes each menu item, an app execution icon, a specific thing or person in a streaming video, a character string, a part of a slide bar, and a specific thing or person in a picture or photo output through the output unit, and targets all objects output through the output unit, and with respect to the gesture graphic, one gesture graphic consists of only one or more gestures or a combination of one or more numbers and one or more gestures.

According to a preferred feature of the present invention, the control unit designates each gesture graphic for execution functions that are not designated using the execution-purpose-graphic objects output through the output unit, and stores the information on the designated execution functions and gesture graphics as gesture information to be matched with the gesture input by the input unit to the storage unit.

According to a preferred feature of the present invention, when a specific gesture is input, the control unit outputs all of the designated gesture graphics for the execution-purpose-graphic objects on the output unit to the output unit.

According to a preferred feature of the present invention, wherein when a specific gesture is input, among the designated gesture graphics for the execution functions that are not designated using the graphic objects, the control unit outputs a mapping list for currently available execution functions and the designated gesture graphics therefor to the output unit.

According to a preferred feature of the present invention, the control unit outputs all of the designated gesture graphics for the execution-purpose-graphic objects on the output unit together with the graphic objects to the output unit.

According to a preferred feature of the present invention, the control unit installs, deletes, modifies, and updates the gesture information on the execution-purpose-graphic objects output through the output unit and the designated gesture graphics therefor, and the gesture information on the execution functions not designated using the graphic objects and the designated gesture graphics therefor in real time through a server and a network, and stores them in the storage unit.

According to a preferred feature of the present invention, the control unit outputs a trajectory of each input gesture operation to the output unit.

According to a preferred feature of the present invention, the gesture information stored in the storage unit includes an app gesture library that each app has and which is used to match recognized gestures when an app function is executed, and a system gesture library that the system has and which is used to match recognized gestures when a system function is executed, and wherein each of the gesture library includes a visible gesture library unit which stores the information on the execution-purpose-graphic objects output through the output unit and the designated gesture graphics therefor as the gesture information, and a hidden gesture library unit which stores the information on the execution functions that are not designated using the execution-purpose-graphic objects output through the output unit and the designated gesture graphics therefor as the gesture information.

According to a preferred feature of the present invention, when an app is installed, the control unit registers the app execution icon output through the output unit and designated gesture graphic therefor to the system gesture library, wherein the designated gesture graphic for the app execution icon uses one designated by the app producer, one recommended by the control unit, or one desired by the user.

According to a preferred feature of the present invention, the control unit uses selected app gesture library to match recognized gestures when an app is currently selected among one or more running apps, and uses the system gesture library to match recognized gestures when none of the apps are running, or none of the apps are selected even though one or more apps are running.

According to a preferred feature of the present invention, the control unit installs, deletes, modifies, updates the app gesture library and the system gesture library in real time through a server and a network, and stores them in the storage unit.

According to a preferred feature of the present invention, when a specific gesture is input to the input unit and the gesture is determined to be a multiple gesture input signal, the control unit outputs a signal indicating for the multiple gesture input state and a signal waiting for gestures input to the output unit, and then repeats a process of receiving input gestures one by one and storing them in the storage unit continuously, wherein when the input gesture is determined to bean termination signal of the multiple gesture input, the control unit matches a plurality of gestures stored so far in the storage unit with the stored gesture information, and executes an operation.

According to a preferred feature of the present invention, when a gesture graphic is designated with multiple gestures which has two or more times of repeated specific gesture, when the specific gesture is output to the output unit, the control unit repeatedly outputs as many gestures as the number of the gesture to the output unit, or outputs only one gesture and outputs the number of the repeated gesture as a subscript.

According to a preferred feature of the present invention, comprising a transmitter located in the input unit and transmitting On and Off signals to the control unit, wherein the control unit outputs all of the designated gesture graphics for the execution-purpose-graphic objects on the output unit to the output unit when the transmitter of the input unit transmits an On signal without a gesture, and maintains the state in which the gesture graphics are output to the output unit when the transmitter continuously maintains an On signal without a gesture, and makes the output gesture graphics disappear from the output unit when the transmitter transmits an Off signal.

According to a preferred feature of the present invention, comprising a transmitter located in the input unit and transmitting On and Off signals to the control unit, wherein when the transmitter of the input unit transmits an On and Off signal twice within a predetermined time without a gesture, the control unit outputs a signal indicating for the multiple gesture input state and a signal waiting for gestures input to the output unit, and then repeats a process of receiving input gestures one by one and storing them in the storage unit continuously, wherein when the transmitter of the input unit transmits an On and Off signal twice again within a predetermined time without a gesture, the control unit matches the plurality of gestures stored so far in the storage unit with the stored gesture information, and executes an operation.

According to a preferred feature of the present invention, comprising a transmitter located in the input unit and transmitting On and Off signals to the control unit, wherein when a gesture graphic is designated with a Multi-On Off gesture which has a specific gesture transmitted together with On and Off signals two or more times within a predetermined time, the control unit outputs the number of times of the On and Off signals input within a predetermined time in front of the specific gesture as a number when output to the output unit.

According to a preferred feature of the present invention, comprising a transmitter located in the input unit and transmitting On and Off signals to the control unit, wherein when a gesture is input to the input unit with On and Off signals two or more times within a predetermined time, the control unit matches the gesture and the number of times of the On and Off signals input within a predetermined time with the stored gesture information, and executes an operation.

Advantageous Effects

According to an embodiment of the present invention, unlike in the conventional remote control system, in order to enable intuitive, easy and quick selection and execution of a desired function by a user, the present invention designates respective gestures to graphic objects such as app execution icons for executing a function on the screen, play buttons of a video player, and purchase button of a home shopping broadcast and the like. And, when the user takes a specific gesture, the gestures designated for the graphic objects as exemplified above are displayed on the screen. Thereby, the user can know the gesture designated to the graphic object on the screen to be executed. And, when the user takes one gesture among them, the function designated for the corresponding graphic object is executed. Through this, the present invention has the advantage of being able to select and execute a desired function on the screen more intuitively and easily, and quickly than a PC mouse.

In addition, since the installation, deletion, addition, update, etc. of the gestures designated through the server and network by the app producer, content provider, system producer, etc. is possible in real time, the present invention has the advantage that a new gesture can be designated to a new function at any time, unlike the existing remote control system where functions are fixed once manufactured and new functions cannot be added.

In addition, the present invention has an advantage in that the user's convenience is not lost even with the minimum number of buttons because numerous gestures can be flexibly used in each situation when a transmitter is configured with buttons.

The effects of the present invention are not limited to the above effects, and it should be understood to include all effects that can be inferred from the configuration of the invention described in the detailed description or claims of the present invention.

DETAILED DESCRIPTION OF THE PREFERRED EMBODIMENT

Figure 1:
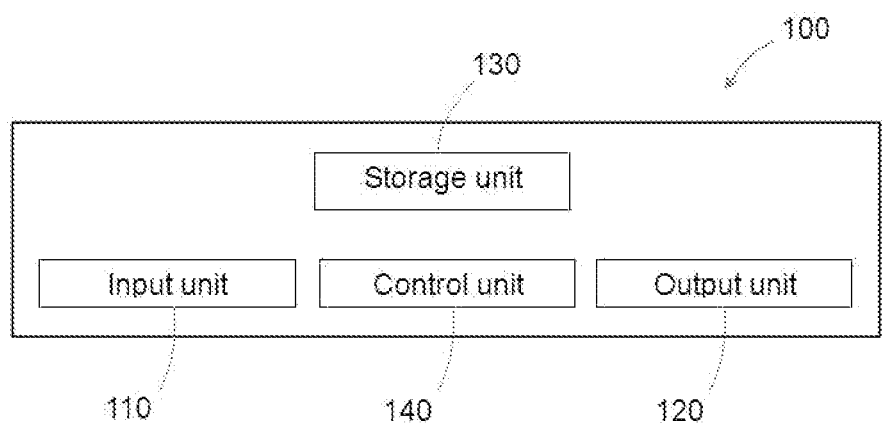
FIG. 1 is a schematic configuration diagram of a remote control system according to an embodiment of the present invention.

Hereinafter, the configuration, operation, and effect of the remote control system according to a preferred embodiment will be described with reference to the accompanying drawings. For reference, in the following drawings, each component is omitted or schematically illustrated for convenience and clarity, and the size of each component does not reflect the actual size. In addition, the same reference numerals refer to the same components throughout the specification, and reference numerals for the same components in individual drawings will be omitted.

FIG. 1 is a conceptual configuration diagram of a remote control system 100 operated by a gesture according to an embodiment of the present invention.

The remote control system includes an input unit 110 and an output unit 120; a storage unit 130 for storing gesture information to be matched with an input gesture; and a control unit 140 electrically connected to at least one of the input unit 110, the output unit 120, and the storage unit 130 to recognize the gesture and control the system, wherein the control unit 140 recognizes a gesture input by the input unit 110, matches the recognized gesture with the gesture information stored in the storage unit 130, executes an operation corresponding to the matched gesture information, and outputs to the output unit 120.

The input unit 110 may be configured as a camera for receiving a gesture operation from the camera-based remote control system 100 according to an embodiment of the present invention. Here, when a person takes gestures using a hand gesture, the camera captures the hand gesture and receives the gesture input.

Figure 2:
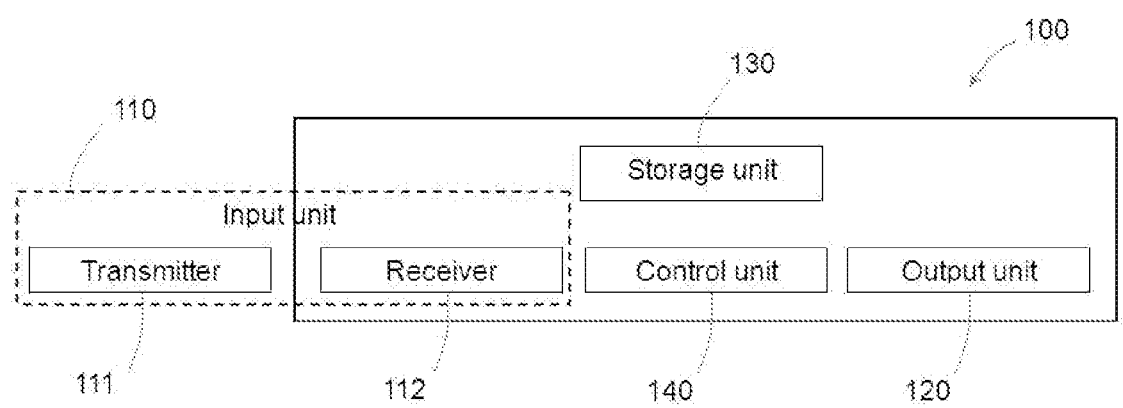
FIG. 2 is a schematic configuration diagram showing that the input unit is composed of a transmitter and a receiver in the remote control system according to an embodiment of the present invention.

In the remote control system 100 according to another embodiment, as shown in FIG. 2, the input unit 110 may include a transmitter 111 for transmitting a gesture and a receiver 112 for receiving a transmitted signal.

The output unit 120 is a device for outputting after executing an operation corresponding to the matched gesture information to be described later, and any configuration is possible as long as it includes a device capable of outputting an image or a video.

The storage unit 130 is a device for storing gesture information to be matched with an input gesture.

And, the control unit 140 serves to control the overall process which recognizes a gesture input to the input unit 110, matches the recognized gesture with the gesture information stored in the storage unit 130, executes the corresponding operation, and outputs to the output unit 120.

According to a preferred feature of the present invention, the control unit 140 outputs information about gestures to be input by the user to the output unit 120.

The biggest problem with the existing gesture-based remote control system is that the user must memorize all the gestures to execute the desired functions. In the existing gesture-based remote control system, as the number of functions increases, the number of gestures to be remembered is inevitably increased. Although the use of gestures is for the convenience of the user, the convenience of the user decreases as the number of functions increases. Therefore, the existing gesture-based remote control system has been used only to the extent that a gesture can be designated and used only for a small number of specific functions in an auxiliary manner.

In response to this problem, the present invention proposes a solution by displaying information on the screen on gestures for executing desired functions without the user having to memorize the gestures. Referring to the example of FIG. 3, there are many apps on the screen, and 1, 2, 3, ㄱ, ㄴ, ㄷ, A, B, and C are separately designated and displayed for each app. These 1, 2, 3, ㄱ, ㄴ, ㄷ, A, B, and C are examples of different gestures designated to run each app.

The system of the present invention provides gestures for executing a function desired by the user on the screen, and when the user takes one of the gestures, the function corresponding to the gesture is executed.

Figure 3:
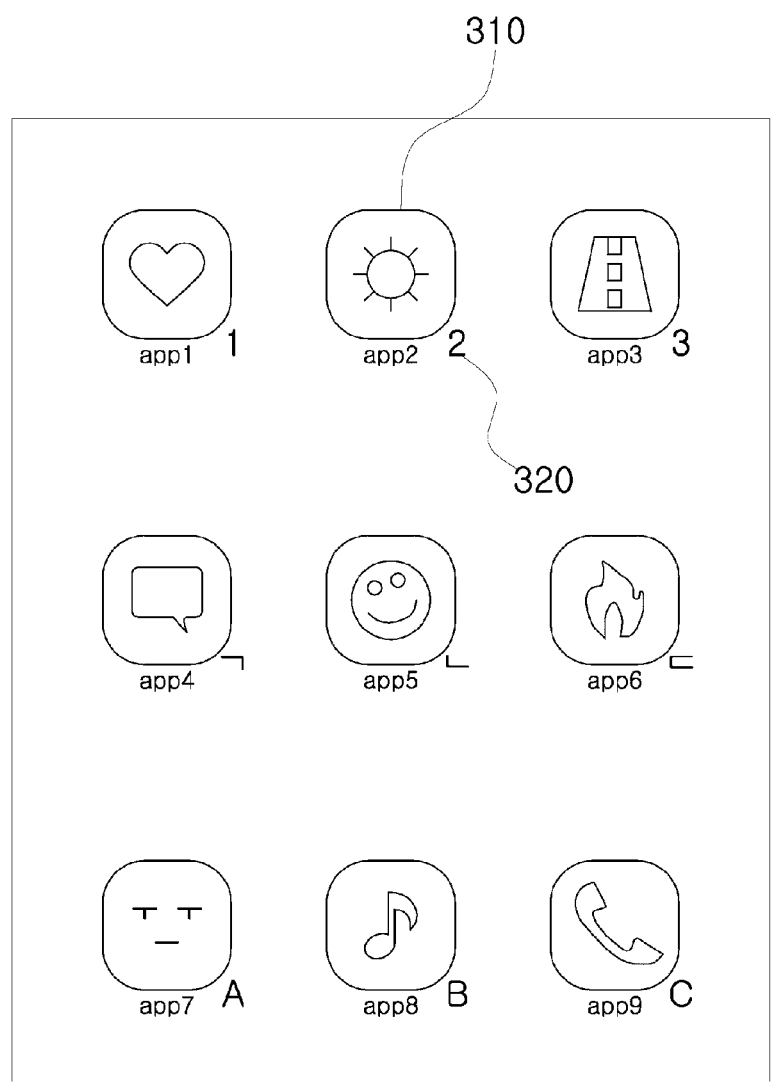
FIG. 3 is a diagram showing information about a gesture to be input by a user is displayed on a screen in the remote control system according to an embodiment of the present invention.

For example, in order to execute app2 310 in the figure of FIG. 3, if the user takes the gesture2 320, app2 310 is executed.

According to a preferred feature of the present invention, the control unit 140 designates each gesture graphic for execution-purpose-graphic objects output through the output unit 120, and stores the information on the designated graphic objects and gesture graphics as gesture information to be matched with the gesture input by the input unit 110 to the storage unit 130; wherein the graphic objects includes each menu item, an app execution icon, a specific thing or person in a streaming video, a character string, a part of a slide bar, and a specific thing or person in a picture or photo output through the output unit 120, and targets all objects output through the output unit 120, and with respect to the gesture graphic, one gesture graphic consists of only one or more gestures or a combination of one or more numbers and one or more gestures.

Figure 4:
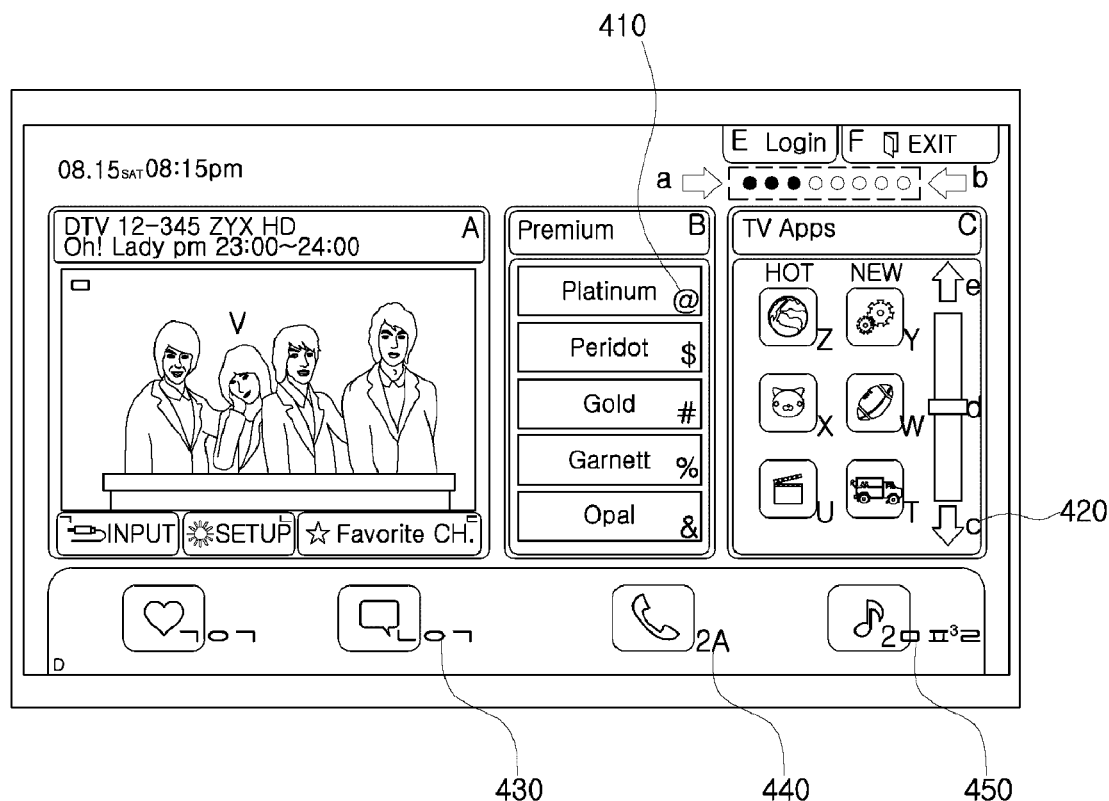
FIG. 4 is a diagram showing that gesture graphics are designated and displayed on graphic objects displayed on a screen in the remote control system according to an embodiment of the present invention.

As in the example of FIG. 4, numerous objects made of graphics such as pictures, app execution icons, texts, slide bars, directories, and people or things in a video are displayed on the screen. And, execution functions corresponding to specific graphic objects among these graphic objects are determined. In the present invention, system producers, app producers, or content providers may designate a desired gesture to each of the graphic objects executing these functions.

In the FIG. 4, numbers, Korean letters, English alphabets, symbols, or a combination thereof are displayed as examples of respective gestures next to each graphic object. The user may execute a function corresponding to the corresponding graphic object by taking the corresponding gesture.

Another big problem in the existing remote control system is that it is not easy to select and execute a desired function from among numerous functions displayed on the screen as in the example of FIG. 4. As mentioned above, the button-type remote control system, which is the most used, is slow and inconvenient for users because it is necessary to find and execute the desired function using the 4-way button and the confirmation button to respond to many functions. In addition, it is difficult to name and call each of the numerous functions on the screen in the first place in the voice recognition method, and the accuracy and responsiveness have not yet reached a satisfactory level, and it is cumbersome to speak. In addition, executing a function on the screen by moving the pointer on the screen in the same way as a 3D space mouse does not yet reach the user's desired responsiveness.

In this regard, in the present invention, as described above, when a user intuitively sees a gesture designated to a graphic object displayed on the screen and takes the gesture, the function is immediately executed. This advantage is faster and more convenient than the method of moving the mouse pointer to the desired graphic object in the mouse system on the PC and clicking the double button to execute it. Even if the user uses it frequently, the gesture of a specific graphic object is automatically remembered.

In this case, since the user executes the function by taking the memorized gesture without having to look at the screen to find the gesture designated to the graphic object on the screen, the desired function can be executed more quickly and conveniently, and the user's convenience can be greatly increased.

On the other hand, here, as in the example of FIG. 4, the gestures designated to each graphic object are not simply designated to one gesture 410 and 420 per graphic object. Multiple gestures 430 and 450 may be designated as necessary. And, in the case of having a transmitter that transmits On and Off signals to the control unit 140 to the input unit 110, which will be described later, a Multi-On Off gesture 440 in which a gesture and more than twice of On and Off signal within a predetermined time are input together may be designated.

If there are a lot of the execution-purpose-graphic objects on the screen, a large number of gestures will be required accordingly. As a result, there will be a limit to the number of simple and easy gestures, so complex gestures will be required a lot. However, the gesture-based remote control system is intended to allow a user to easily and conveniently execute a function using a gesture. Due to this complex gesture, it may be difficult for the user to take a gesture or a situation in which the gesture recognition rate of the control unit 140 decreases may happen.

In this regard, the present invention provides a combination of a plurality of simple and easy gestures or a combination of Multi-On Off signals and gesture by using the multiple gestures and the Multi-On Off gesture as described above, so that many functions can be covered with a small number of gestures.

And, as shown in FIG. 4, the gesture graphic for displaying a designated gesture graphically on the screen is displayed as only one or more gestures 410, 420 and 430 or a combination of one or more numbers and one or more gestures 440 and 450, so that the multiple gestures and the Multi-On Off gestures can be displayed.

According to a preferred feature of the present invention, the control unit 140 designates each gesture graphic for execution functions that are not designated using the execution-purpose-graphic objects output through the output unit 120, and stores the information on the designated execution functions and gesture graphics as gesture information to be matched with the gesture input by the input unit to the storage unit 130.

As described above, it is possible to run an app, select a menu, and move the slide bar up or down through the designated gesture graphic in the graphic object displayed on the screen. However, in order to operate the system using only the graphic objects displayed on the screen and the designated gesture graphic for all execution functions, it may be complicated by making more graphic objects than necessary on the screen, and rather the user's convenience may be reduced.

In this regard, the present invention designates each gesture graphic for necessary execution functions, which are not using the graphic objects on the screen, and stores information on the designated execution functions and gesture graphics as gesture information in the storage unit 130.

Figure 5:
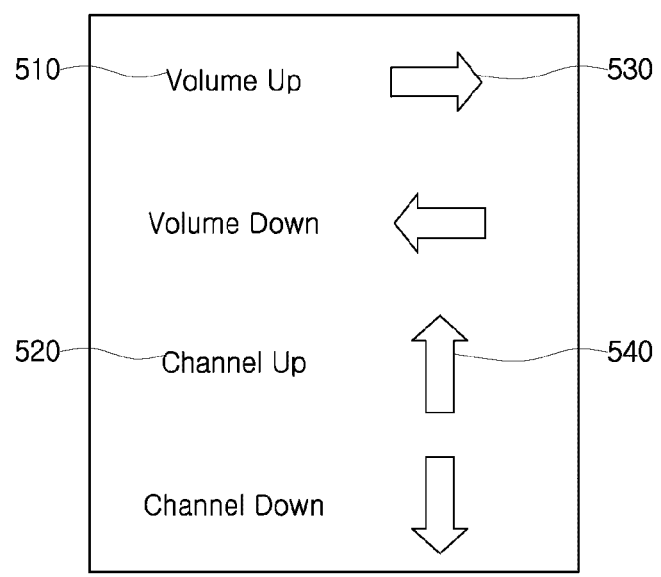
FIG. 5 is a mapping list of gesture graphics designated for execution functions that are not designated using graphic objects on the screen in the remote control system according to an embodiment of the present invention.

As in the example of FIG. 5, the present invention can directly designate the gesture graphics 530 and 540 without a graphic object for the function 510 for raising the sound or the function 520 for raising the TV channel.

According to a preferred feature of the present invention, when a specific gesture is input, the control unit 140 outputs all of the designated gesture graphics for the execution-purpose-graphic objects on the output unit 120 to the output unit 120.

The user cannot memorize all the gesture graphics that are designated to all the execution-purpose-graphic objects output on the screen. However, if the gesture graphics are displayed continuously on the screen just because the user can't remember, the screen will be full of the gesture graphics and the graphics objects, so that it looks complicated. Eventually, the user's concentration and convenience will be reduced.

In this regard, the present invention shows all the gesture graphics designated for the execution-purpose-graphic objects on the current screen only when the user makes a specific gesture. That is, the user's convenience is enhanced by allowing the user to see the gesture graphics designated for the graphic objects on the screen only when the user wants them.

According to a preferred feature of the present invention, when a specific gesture is input, among the designated gesture graphics for the execution functions that are not designated using the graphic objects, the control unit outputs a mapping list for currently available execution functions and the designated gesture graphics therefor to the output unit 120.

Even if the user searches for graphic objects for executing the function currently displayed on the screen, the desired function may not be found among them. For example, the sound control function is a necessary function, but for this function, the app producer may not want to put a graphic object on the screen and designate the gesture graphic to execute it. In this case, when the user takes a specific gesture, as in the example of FIG. 5, the control unit 140 displays on the screen a mapping list for all the currently available execution functions and the gesture graphics, among all the gesture graphics designated for the execution functions, which are not designated using the graphic objects. For example, the user may see the mapping list, check the desired function and gesture, and then take the rightward gesture 530 to increase the sound.

According to a preferred feature of the present invention, the control unit 140 outputs all of the designated gesture graphics for the execution-purpose-graphic objects on the output unit 120 together with the graphic objects to the output unit 120.

As display technology develops, many electronic devices are manufactured using a large screen as much as possible. In this situation, even if all graphic objects are displayed on a relatively large screen in a specific device, which doesn't have many execution functions, there may be still abundant space available on the screen. In this case, it does not look complicated even if all of the graphic objects for executing functions and the gesture graphics designated therein are displayed together on the screen. This function shows the gesture graphics on the screen even if the user does not take a gesture.

According to a preferred feature of the present invention, the control unit 140 installs, deletes, modifies, and updates the gesture information on the execution-purpose-graphic objects output through the output unit 120 and the designated gesture graphics therefor, and the gesture information on the execution functions not designated using the graphic objects and the designated gesture graphics therefor in real time through a server and a network, and stores them in the storage unit 130.

One of the major drawbacks of the existing remote control system is that products that have already been produced cannot be modified or upgraded. Therefore, when the existing remote control system is produced and released at the factory, its function must be used as it is. For example, in the case of a button-type remote controller, since the button is already physically fixed and produced, it is of course impossible to modify it. However, in case of the smart TV, it can be used continuously. The reason is, the smart TV displays execution functions on the screen. And, the user can find and select a desired function using the four direction buttons, and executes the function by pressing the confirmation button, so the user can continue to use it even if the functions are increased. However, in this method, in order to find a desired function on the screen, the user's convenience is greatly reduced because the user has to press the confirmation button again even after finding the desired function by pressing the four direction buttons a lot.

Figure 6:
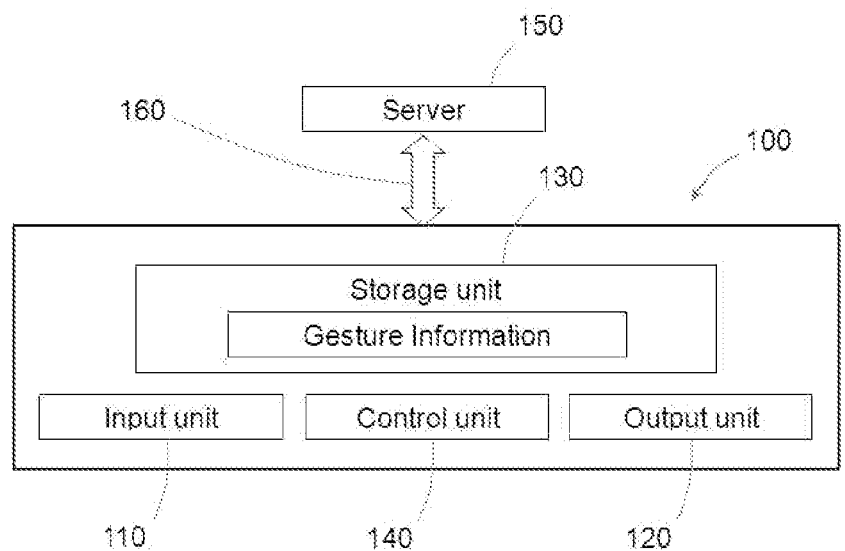
FIG. 6 is a schematic configuration diagram for installing, deleting, modifying, and updating gesture information through a server and a network in a remote control system according to an embodiment of the present invention.

In this regard, the present invention enables installation, deletion, modification, and updating of the gesture information in real time through the server 150 and the network 160 as shown in the example of FIG. 6, so that if a new function is added to the system, the present invention designates a new gesture graphic accordingly, and stores the information about it in the storage unit 130.

According to a preferred feature of the present invention, the control unit 140 outputs a trajectory of each input gesture operation to the output unit 120.

When a user initially inputs a gesture to the input unit 110, the user does not know which sensitivity level of speed or magnitude of the gesture is required. In this regard, as a preferred example, the control unit 140 may display the trajectory display of the gesture operation input on the input unit 110 to the output unit 120 as an overlay. The users can see this trajectory display and adjust the gesture by estimating the sensitivity of the gesture operation.

According to a preferred feature of the present invention, the gesture information stored in the storage unit 130 includes an app gesture library 710 that each app has and which is used to match recognized gestures when an app function is executed, and a system gesture library 720 that the system has and which is used to match recognized gestures when a system function is executed, and wherein each of the gesture library 710 and 720 includes a visible gesture library 711 and 721 unit which stores the information on the execution-purpose-graphic objects output through the output unit 120 and the designated gesture graphics therefor as the gesture information, and a hidden gesture library unit 712 and 722 which stores the information on the execution functions that are not designated using the execution-purpose-graphic objects output through the output unit 120 and the designated gesture graphics therefor as the gesture information.

Figure 7:
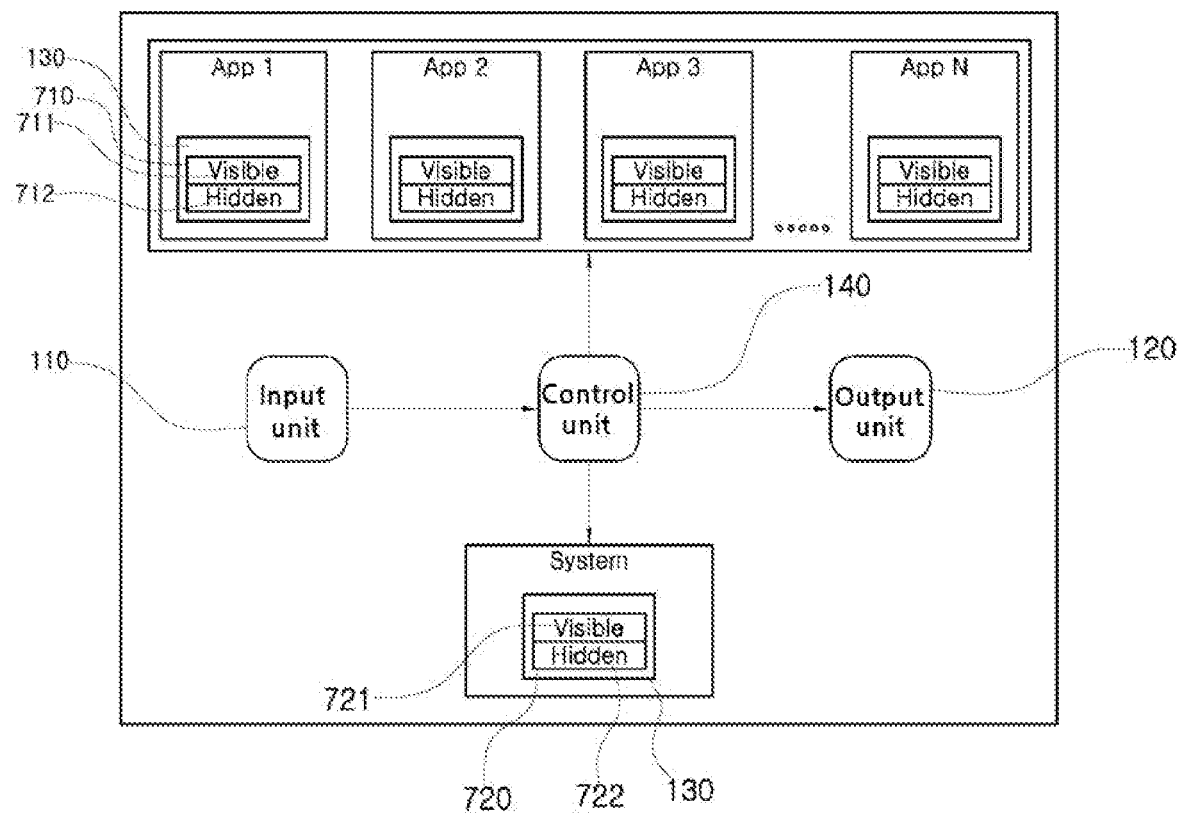
FIG. 7 is a schematic configuration diagram showing that the app and the system have each gesture library, and each gesture library is composed of a visible library and a hidden library in a remote control system according to an embodiment of the present invention.

In order for app producers and system producers to store and manage the designated gesture graphics as gesture information in their own ecosystem, as shown in the example of FIG. 7, the gesture information includes an app gesture library 710 that each app has and a system gesture library 720 that the system has. Each gesture library 710 and 720 includes a visible gesture library units 711 and 721 based on the graphic objects shown on the screen and hidden gesture library units 712 and 722 based on the execution functions that do not use the graphic objects shown on the screen.

According to a preferred feature of the present invention, an app is installed, the control unit 140 registers the app execution icon output through the output unit and designated gesture graphic therefor to the system gesture library 720, wherein the designated gesture graphic for the app execution icon uses one designated by the app producer, one recommended by the control unit 140, or one desired by the user.

The installed app itself is an app on the system, and when the app is installed, the app execution icon displayed on the system screen is only an execution-purpose-graphic object on the system screen. Therefore, when the app is installed, the graphic object and the gesture graphic accompanying it are registered in the system gesture library 720. If the app producer is a well-known brand producer or broadcaster, the designated gesture graphic may want to use the app's own gestures. For example, CNN, a famous broadcaster, can make a news app and make its app's gesture graphics look similar to English CNN with its own multiple gestures. However, in a specific case, multiple gestures having a shape similar to the CNN may already be registered in the user's system gesture library 720. In this way, when a new gesture graphic is installed and designation becomes impossible because there is a predefined gesture graphic, the control unit 140 may recommend another gesture graphic. In addition, the user can designate and use the desired gesture graphic.

According to a preferred feature of the present invention, the control unit 140 uses selected app gesture library 710 to match recognized gestures when an app is currently selected among one or more running apps, and uses the system gesture library 720 to match recognized gestures when none of the apps are running, or none of the apps are selected even though one or more apps are running.

As described above, the present invention includes an app gesture library 710 produced, executed, and managed by each app producer, and a system gesture library 720 produced, executed, and managed by a system producer for gesture information management. The present invention increases user convenience by showing and selecting many gestures on the screen so that functions can be executed quickly, easily, and conveniently. But, the biggest problem that comes from using so many gestures is when a gesture conflict occurs.

Each of the app gesture library 710 and the system gesture library 720 will be managed when the occurrence of gesture conflicts during the respective app producer and system producer developing their own SW programs. If a gesture conflict occurs inside the respective gesture libraries 710 and 720, it is discovered through the same steps as compiling during SW development, and since this is a bug, it can be corrected. However, if a gesture exists in the app gesture library 710 and the system gesture library 720 at the same time, this may be a problem. In addition, since convenient and easy gestures are frequently used in any gesture library 710 and 720, the probability of occurrence of a gesture conflict will be higher.

In order to solve this problem, the present invention divides a case in which each app is executed and a case in which the system is executed. When matching input gestures, the gestures conflict is prevented by using its own gesture library 710 and 720 only when its own function is executed, whatever an app or the system is executed.

According to a preferred feature of the present invention, the control unit 140 installs, deletes, modifies, updates the app gesture library 710 and the system gesture library 720 in real time through a server 150 and a network 160, and stores them in the storage unit 130.

Figure 8:
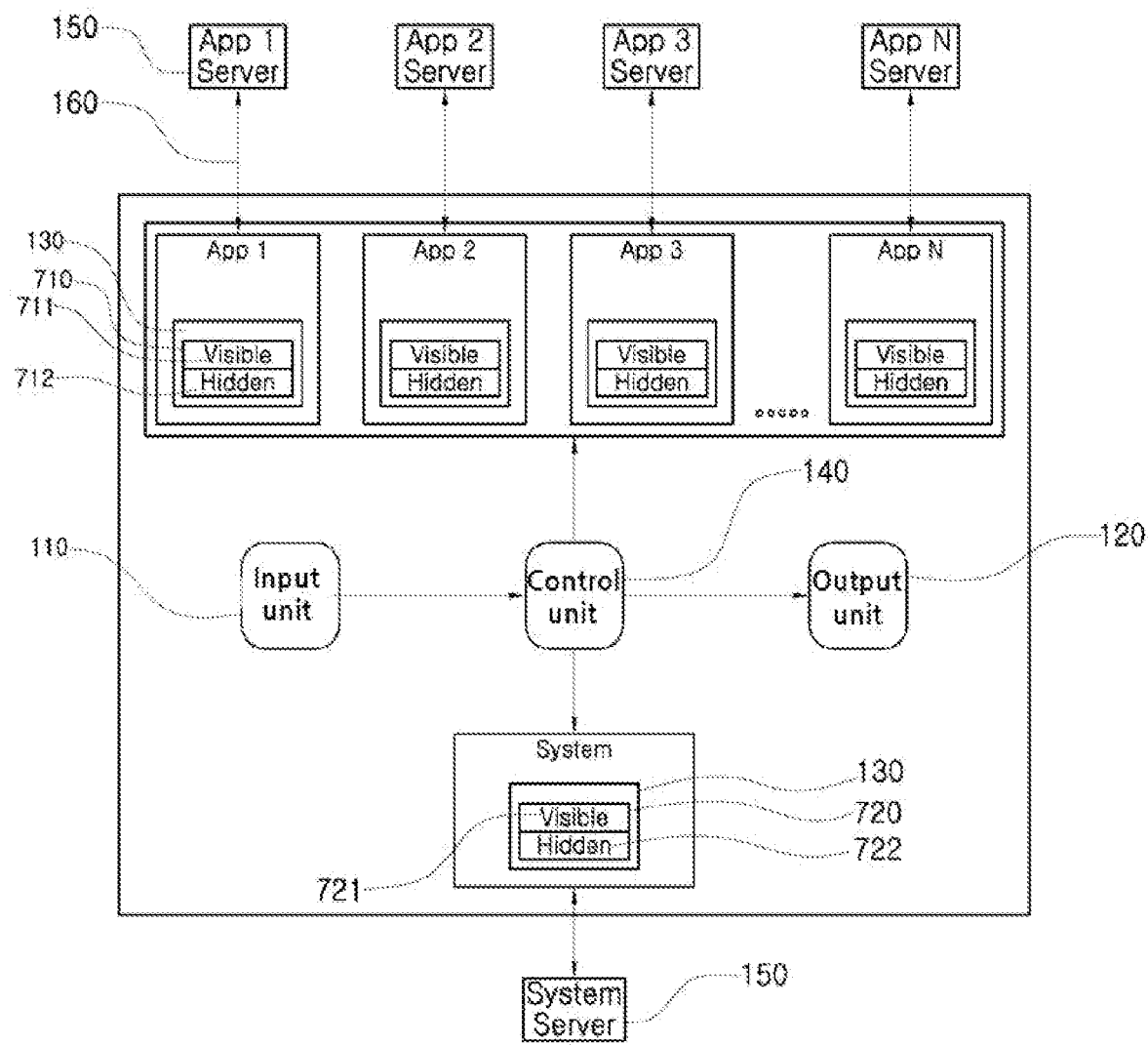
FIG. 8 is a schematic configuration diagram showing the situation in which each app gesture library and system gesture library are installed, deleted, modified, and updated through each server and network in a remote control system according to an embodiment of the present invention.

As in the example of FIG. 8, each app producer and system producer install, delete, modify, and update their gesture libraries 710 and 720 in real time using each server 150 and network 160, respectively, and store them in the storage unit 130. In the existing remote control system, when an app is executed, only the functions within the range set by the system producer can be used. However, according to the present invention, an app producer can independently operate an app with their own functions using their own gesture library 710.

For example, a home shopping company that is an app producer may designate and send gesture graphics by updating the app gesture library 710 in real time that there is a surprise special discount on a product displayed on the screen during real-time broadcasting.

In this case, if the user simply takes a specific gesture as described above while watching the real-time broadcast, then all currently available gesture graphics are displayed on the screen of the broadcast. If the user makes a gesture of the designated gesture graphic for the product displayed on the screen among the displayed gesture graphics, the information provided by the home shopping company can be viewed.

In addition, when a news company conducts a real-time survey during broadcasting in real time, the present invention updates the app gesture library 710 in real time to display various options that can be selected for real-time survey on the screen and gesture graphics designated for the options. Therefore, the user can select a desired option by selecting a gesture graphic on the screen. In addition, even in a situation of exchanging with user in real time, easy and convenient interactive broadcasts with user is possible by using various gesture graphics.

In addition to this, if the respective producers can install, delete, modify, update the app and the system gesture library 710 and 720 in real time and store it in the storage unit 130, the fields that can be applied by using it are limitless.

According to a preferred feature of the present invention, when a specific gesture is input to the input unit 110 and the gesture is determined to be a multiple gesture input signal, the control unit 140 outputs a signal indicating for the multiple gesture input state and a signal waiting for gestures input to the output unit 120, and then repeats a process of receiving input gestures one by one and storing them in the storage unit continuously, wherein when the input gesture is determined to bean termination signal of the multiple gesture input, the control unit 140 matches a plurality of gestures stored so far in the storage unit 130 with the stored gesture information, and executes an operation.

As described above, unlike the previous gesture-based remote control system, the present invention can receive not only a single gesture, but also multiple gestures. When a specific gesture graphic is composed of multiple gestures and designated to a specific graphic object, the user must input multiple gestures to the input unit 110 in order to execute a function corresponding to the graphic object, and the control unit 140 must be able to receive and recognize multiple gestures, and to determine mutual matching with stored gesture information.

In order to receive multiple gestures, the control unit 140 does not immediately execute a gesture upon receiving one gesture as in a normal situation, but must wait for more incoming gestures. When the user makes a specific gesture, the control unit 140 can receive a multiple gesture inputs, display them step by step on the screen, and wait until input of each of the multiple gestures desired by the user is finished. When the user takes a specific gesture and notifies that there is no additional gesture input, the control unit 140 sums up all gestures stored so far to match the stored gesture information.

According to a preferred feature of the present invention, when a gesture graphic is designated with multiple gestures which has two or more times of repeated specific gesture, when the specific gesture is output to the output unit 120, the control unit repeatedly outputs as many gestures as the number of the gesture to the output unit 120, or outputs only one gesture and outputs the number of the repeated gesture as a subscript.

When the gesture graphic is displayed on the screen, if all gestures are displayed one by one in order to display the multiple gestures, the gesture graphic display becomes long and may appear overlapping with a nearby graphic object. In this regard, the present invention, as in the example 450 shown in FIG. 4, when a specific gesture is repeated two or more times and displayed on the screen, if the gesture is marked with a subscript like the exponential notation in mathematics, the gesture graphic display may be displayed shortly, and it may be an interesting point.

According to a preferred feature of the present invention, comprising: a transmitter located in the input unit 110 and transmitting On and Off signals to the control unit 140, wherein the control unit 140 outputs all of the designated gesture graphics for the execution-purpose-graphic objects on the output unit 120 to the output unit when the transmitter of the input unit 110 transmits an On signal without a gesture, and maintains the state in which the gesture graphics are output to the output unit 120 when the transmitter continuously maintains an On signal without a gesture, and makes the output gesture graphics disappear from the output unit 120 when the transmitter transmits an Off signal.

Any device capable of generating On and Off signals, such as a button, a switch, an optical type button, a magnetic field type button, a touch button, a touch pad, a joystick, a touch panel, and a touch screen can be used as the transmitter located in the input unit 110 and transmitting On and Off signals to the control unit 140.

As a preferred embodiment, as in the example of FIG. 2, the input unit 110 may be configured of transmitter 111 including a button and receiver 112 for receiving the transmitted content. For users who are bothered by gestures, when button is pressed once (On) without a gesture, all gesture graphics designated to all execution-purpose-graphic objects in the current screen situation are displayed on the screen. And, while the button is kept pressed (On), all the gesture graphics are continuously displayed on the screen, and when the button is released (Off), all the gesture graphics on the screen disappear.

From the user's point of view, the display function of the graphic object on the screen and the designated gesture graphic for it will be a very frequently used function. Therefore, the user's convenience can be maximized by designating the single button press, which is the simplest operation, to this function. This will be more convenient and faster than voice recognition using speech.

According to a preferred feature of the present invention, comprising a transmitter located in the input unit 110 and transmitting On and Off signals to the control unit 140, wherein when the transmitter of the input unit 110 transmits an On and Off signal twice within a predetermined time without a gesture, the control unit 140 outputs a signal indicating for the multiple gesture input state and a signal waiting for gestures input to the output unit 120, and then repeats a process of receiving input gestures one by one and storing them in the storage unit 130 continuously, wherein when the transmitter of the input unit 110 transmits an On and Off signal twice again within a predetermined time without a gesture, the control unit 140 matches the plurality of gestures stored so far in the storage unit 130 with the stored gesture information, and executes an operation.

As a preferred embodiment, as in the example of FIG. 2, the input unit 110 may be composed of transmitter 111 including a button and receiver 112 for receiving the transmitted content. From the user's point of view, gestures can also be cumbersome. The start and end of the multiple gesture inputs are notified to the control unit 140 by double-clicking. In reality, if the multiple gesture designation is a lot to the gesture graphics, it will be a very convenient function for users.

According to a preferred feature of the present invention, comprising a transmitter located in the input unit 110 and transmitting On and Off signals to the control unit 140, wherein when a gesture graphic is designated with a Multi-On Off gesture which has a specific gesture transmitted together with On and Off signals two or more times within a predetermined time, the control unit 140 outputs the number of times of the On and Off signals input within a predetermined time in front of the specific gesture as a number when output to the output unit 120.

As a preferred embodiment, as in the illustration of the present invention in FIG. 4, when a Multi-On Off gesture using two or more On and Off signals within a predetermined time is displayed on the screen, the control unit 140 display (440) a number in front of the gesture.

According to a preferred feature of the present invention, comprising a transmitter located in the input unit 110 and transmitting On and Off signals to the control unit 140, wherein when a gesture is input to the input unit 110 with On and Off signals two or more times within a predetermined time, the control unit 140 matches the gesture and the number of times of the On and Off signals input within a predetermined time with the stored gesture information, and executes an operation.

When a specific gesture graphic is designated as a Multi-On Off gesture, the user must input the Multi-On Off gesture to the input unit 110. In this regard, the control unit 140 should be able to receive and recognize the Multi-On Off gesture, and to match mutually and determine with the stored gesture information. The control unit matches the gesture and the number of times of the On and Off signals input within a predetermined time with the stored gesture information, and executes an operation.

Although preferred embodiments of the present invention have been described with reference to the accompanying drawings, the embodiments described in the present specification and the configurations shown in the drawings are only the most preferred embodiments of the present invention and do not represent all of the technical ideas of the present invention. Therefore, it should be understood that the present invention may have various equivalents and modifications that can be substituted for them at the time of filing the present application.

Therefore, the embodiments described above are to be understood as illustrative and not restrictive in all respects, and the scope of the present invention is indicated by the following claims rather than the detailed description, and the meaning and scope of the claims and their all changes or modifications derived from the concept of equivalents should be construed as being included in the scope of the present invention.

EXPLANATION OF SYMBOLS

- 100: remote control system
- 110: input unit
- 111: transmitter
- 112: receiver
- 120: output unit
- 130: storage unit
- 140: control unit
- 150: server
- 160: network
- 310: app execution icon
- 320: gesture of user
- 410, 420: single gesture
- 430: multiple gestures
- 440: Multi-On Off gesture
- 450: multiple gestures
- 510: execution function (volume up) not designated using graphic object
- 520: execution function (channel up) not designated using graphic object
- 530: gesture graphic designated to volume up
- 540: gesture graphic designated to channel up
- 710: app gesture library
- 711: visible gesture library of app gesture library
- 712: hidden gesture library of app gesture library
- 720: system gesture library
- 721: visible gesture library of system gesture library
- 722: hidden gesture library of system gesture library

What is claimed is:

1. A remote control system operated by gestures, comprising:

an input unit and an output unit;

a storage unit for storing gesture information to be matched with an input gesture; and a control unit electrically connected to at least one of the input unit, the output unit, and the storage unit to recognize the gesture and control the system, wherein the control unit recognizes a gesture input by the input unit, matches the recognized gesture with the gesture information stored in the storage unit, executes an operation corresponding to the matched gesture information, and outputs to the output unit, wherein a gesture graphic, which displays a designated gesture graphically, consists of one or more gestures or a combination of one or more numbers and one or more gestures, wherein graphic objects include each menu item, an app execution icon, a specific thing or person in a streaming video, a character string, a part of a slide bar, and a specific thing or person in a picture or photo output through the output unit, and targets all objects output through the output unit, and wherein the control unit designates each gesture graphic for function execution-purpose-graphic objects output through the output unit, and stores the information on the graphic objects and designated gesture graphics as gesture information to be matched with the gesture input by the input unit to the storage unit.

2. The remote control system of claim 1, wherein the control unit designates each gesture graphic for execution functions that are not designated using the function execution-purpose-graphic objects output through the output unit, and stores the information on the designated execution functions and gesture graphics as gesture information to be matched with the gesture input by the input unit to the storage unit.

3. The remote control system of claim 1, wherein when a specific gesture is input, the control unit outputs all of the designated gesture graphics for the function execution-purpose-graphic objects on the output unit to the output unit.

4. The remote control system of claim 2, wherein when a specific gesture is input, among the designated gesture graphics for the execution functions that are not designated using the graphic objects, the control unit outputs a mapping list for currently available execution functions and the designated gesture graphics therefor to the output unit.

5. The remote control system of claim 1, wherein the control unit outputs all of the designated gesture graphics for the function execution-purpose-graphic objects output on the output unit together with the graphic objects to the output unit.

6. The remote control system of claim 1, wherein the control unit installs, deletes, modifies, and updates the gesture information on the function execution-purpose-graphic objects output through the output unit and the designated gesture graphics therefor, and the gesture information on the execution functions not designated using the graphic objects and the designated gesture graphics therefor in real time through a server and a network, and stores them in the storage unit.

7. The remote control system of claim 1, wherein the control unit outputs a trajectory of each input gesture operation to the output unit.

8. The remote control system of claim 1,
wherein the gesture information stored in the storage unit includes an app gesture library that each app has and which is used to match recognized gestures when an app function is executed, and a system gesture library that the system has and which is used to match recognized gestures when a system function is executed, and
wherein each of the gesture library includes a visible gesture library unit which stores the information on the function execution-purpose-graphic objects output through the output unit and the designated gesture graphics therefor as the gesture information, and a hidden gesture library unit which stores the information on the execution functions that are not designated using the function execution-purpose-graphic objects output through the output unit and the designated gesture graphics therefor as the gesture information.

9. The remote control system of claim 8, wherein when an app is installed, the control unit registers the app execution icon output through the output unit and designated gesture graphic therefor to the system gesture library, wherein the designated gesture graphic for the app execution icon uses one designated by the app producer, one recommended by the control unit, or one desired by the user.

10. The remote control system of claim 8, wherein the control unit uses selected app gesture library to match recognized gestures when an app is currently selected among one or more running apps, and uses the system gesture library to match recognized gestures when none of the apps are running, or none of the apps are selected even though one or more apps are running.

11. The remote control system of claim 8, wherein the control unit installs, deletes, modifies, updates the app gesture library and the system gesture library in real time through a server and a network, and stores them in the storage unit.

12. The remote control system of claim 1,
wherein when a specific gesture is input to the input unit and the gesture is determined to be a multiple gesture input signal, the control unit outputs a signal indicating for the multiple gesture input state and a signal waiting for gestures input to the output unit, and then repeats a process of receiving input gestures one by one and storing them in the storage unit continuously,
wherein when the input gesture is determined to bean termination signal of the multiple gesture input, the control unit matches a plurality of gestures stored so far in the storage unit with the stored gesture information, and executes an operation.

13. The remote control system of claim 1, wherein when a gesture graphic is designated with multiple gestures which has two or more times of repeated specific gesture, when the specific gesture is output to the output unit, the control unit repeatedly outputs as many gestures as the number of the gesture to the output unit, or outputs only one gesture and outputs the number of the repeated gesture as a subscript.

14. The remote control system of claim 1, further comprising a transmitter located in the input unit and transmitting On and Off signals to the control unit,
wherein the control unit outputs all of the designated gesture graphics for the function execution-purpose-graphic objects on the output unit to the output unit when the transmitter of the input unit transmits an On signal without a gesture, and maintains the state in which the gesture graphics are output to the output unit when the transmitter continuously maintains an On signal without a gesture, and makes the output gesture graphics disappear from the output unit when the transmitter transmits an Off signal.

15. The remote control system of claim 1, further comprising a transmitter located in the input unit and transmitting On and Off signals to the control unit,
wherein when the transmitter of the input unit transmits an On and Off signal twice within a predetermined time without a gesture, the control unit outputs a signal indicating for the multiple gesture input state and a signal waiting for gestures input to the output unit, and then repeats a process of receiving input gestures one by one and storing them in the storage unit continuously,
wherein when the transmitter of the input unit transmits an On and Off signal twice again within a predetermined time without a gesture, the control unit matches the plurality of gestures stored so far in the storage unit with the stored gesture information, and executes an operation.

16. The remote control system of claim 1, further comprising a transmitter located in the input unit and transmitting On and Off signals to the control unit,
wherein when a gesture graphic is designated with a Multi-On Off gesture which has a specific gesture transmitted together with On and Off signals two or more times within a predetermined time, the control unit outputs the number of times of the On and Off signals input within a predetermined time in front of the specific gesture as a number when output to the output unit.

17. The remote control system of claim 1, further comprising a transmitter located in the input unit and transmitting On and Off signals to the control unit,
wherein when a gesture is input to the input unit with On and Off signals two or more times within a predetermined time, the control unit matches the gesture and the number of times of the On and Off signals input within a predetermined time with the stored gesture information, and executes an operation.

\* \* \* \* \*